United States Patent [19]

Gibson

[11] Patent Number: 5,253,043

[45] Date of Patent: Oct. 12, 1993

[54] UPSAMPLED INTERPOLATIVE PROCESSING OF DIGITAL VIDEO SIGNALS

[75] Inventor: Joel D. Gibson, Jacksonville, Fla.

[73] Assignee: da Vinci Systems, Inc., Ft. Lauderdale, Fla.

[21] Appl. No.: 781,894

[22] Filed: Oct. 24, 1991

[51] Int. Cl.⁵ .............................................. H04N 11/02
[52] U.S. Cl. ..................... 358/21 R; 358/180; 358/138; 358/13
[58] Field of Search ............... 358/11, 13 C, 13, 140, 358/133, 137, 138, 180, 21 R, 21 V

[56] References Cited

U.S. PATENT DOCUMENTS

| | | | |
|---|---|---|---|
| 4,419,686 | 12/1983 | Morrison | 358/13 C |
| 4,528,585 | 7/1985 | Bolger | 358/180 |
| 4,568,966 | 2/1986 | Lippel | 358/138 |
| 4,642,682 | 2/1987 | Osburn et al. | 358/80 |
| 4,672,424 | 6/1987 | Lechner | 358/11 |
| 4,716,453 | 12/1987 | Pawelski | 358/138 |
| 4,727,412 | 2/1988 | Fearing et al. | 358/22 |
| 4,809,059 | 2/1989 | Flamm et al. | 358/27 |
| 4,876,589 | 10/1989 | Osburn et al. | 358/22 |
| 4,951,127 | 8/1990 | Mehrgardt et al. | 358/28 |
| 5,041,906 | 8/1991 | Matsumoto | 358/21 R |
| 5,049,993 | 9/1991 | Legall et al. | 358/138 |
| 5,138,452 | 8/1992 | Soloff | 358/180 |

OTHER PUBLICATIONS

Discrete-Time Signal Processing by Oppenheim & Schafer, 1989 pp. 105–111.
CCIR Recommendation 601-1, 1986 L64260/L64261 High Speed Versatile FIR Filter (VFIR) Preliminary LSI Logic Corporation.

*Primary Examiner*—James J. Groody
*Assistant Examiner*—Jeffrey S. Murrell
*Attorney, Agent, or Firm*—Jones & Askew

[57] ABSTRACT

A digital processing system for providing spectral headroom to accommodate harmonic distortion components resulting from non-linear processing of digitized samples of video signals is shown. A standard set of video signal samples are all upsampled and filtered so that they have a common sampling rate. These are filtered to provide spectral headroom. Non-linear operations are then performed on the upsampled and filtered sequences. After processing, the processed upsampled signals are filtered to remove the harmonic components, and then the signals are decimated to reestablish their original sampling rates. This provides non-linear processing for signal sequences which were originally band limited, yet avoids the appearance of aliased frequencies in the output that normally result from harmonic distortion components generated by non-linear processing.

11 Claims, 4 Drawing Sheets

Fig. 5

UPSAMPLED INTERPOLATIVE PROCESSING OF DIGITAL VIDEO SIGNALS

TECHNICAL FIELD

The present invention relates to digital processing of television video signals and in particular, is an improved method and apparatus for processing standard 4:2:2 digital video signals. It is particularly useful in digital systems for color correction and modification.

CROSS REFERENCE TO DISCLOSURE DOCUMENT

This invention is the subject matter of Disclosure Document Ser. No. 288,555 filed in the United States Patent and Trademark Office on Aug. 5, 1991.

BACKGROUND OF THE INVENTION

Color correction modification has been in widespread use in connection with television advertisements and various aspects of film to tape transfer including preservation and restoration of color prints of deteriorating film media. Very sophisticated apparatus for finally selecting signal levels representing particular hues, and combinations of hue and saturation, in video signals have been developed. For example, color correcting apparatus shown in U.S. Pat. Nos. 4,642,682; 4,727,412; and 4,876,589 indicate that this is indeed a well developed art.

In recent years, much attention of members of television industries throughout the world have been turned to various proposals and apparatus for providing high definition television (HDTV) with both digital and analog composite signal methods.

As is well known to those skilled in the art, the NTSC standard broadcast television signal was adopted in the United States in 1941 and popularized shortly after World War II. In 1953, the current NTSC standard for color television broadcasting including a 3.58 mega-Hertz subcarrier carrying the chroma information, which composite signal was compatible with NTSC monochrome receivers, was adopted. Since continental Europe was recovering from the effects of World War II, it was somewhat later in adopting standard television signals. Most of Europe adopted a standard Phase Alteration by Line (PAL) composite broadcast signal with better resolution than that of the NTSC format. The French, being the French and needing to be different, adopted a color system known as SECAM.

Irrespective of the particular details of the standard for the composite signals, color television has labored in recent years under the burden of a composite signal specification which was state of the art per 1950 technology, but which has effectively retarded the development of higher quality television broadcasts for consumers.

Due to the ubiquitous spread, and tremendous cost reductions, of digital circuitry, the exchange of television and other video signals is most commonly accomplished by transmission of digitized video signals via satellite, microwave links and the like until such signals are converted to analog signals, and then composite broadcast television signals, for over-the-air transmission to home receivers.

In order to promote the international interchange of video signals and to standardize the interface between digital video signal sources and devices utilizing or transmitting same, the International Radio Consultant Committee (CCIR) promulgated Recommendation No. 601-1 in 1986 which defines a standard set of digitized color signals for television studios. CCIR Recommendation 601-1 (1986) is hereby incorporated by reference. The encoding of parameters as specified at sampling frequencies having the ratios 4:2:2. The fundamental frequency to which these ratios refer is derived from an analysis of common factors in the number of picture elements in NTSC 525 line and PAL 625 line television systems.

The standard signals are defined in Recommendation 601-1. Essentially, they consist of a luminance signal Y and two color difference signals (R−Y) and (B−Y). It is well known that, since the luminance signal contains information on levels of red, green and blue (R,G,B) that the three standard signals can be used to unambiguously reproduce the RGB levels for any given set of samples. As used in this specification, the term algebraic combination signal refers to any signal value for a color television system which is one signal of a set of signals which can be used to unambiguously derive RGB values. In other words, an algebraic combination signal is one of a set of signals which possess orthogonality such that unique and correct RGB values may be derived. Thus, the standard Recommendation 601-1 Y, (R−Y), and (B−Y) signals are a set of three algebraic combination signals. Similarly, R, G, and B signals form a set of algebraic combination signals.

It should be noted that appendices to Recommendation 601-1 contemplate systems in which the algebraic combination signals are sampled at ratios of 4:4:4. The 4:4;4 system contemplated by Recommendation 601-1 is one for which the signals are red, green and blue signals, rather than luminance and two color difference signals.

As noted hereinabove, color correction and modification is used in a number of applications within the television industry and other businesses which make use of video signals. Its principle use is in film to tape transfers and post production processing of commercials to highlight certain objects, colors and the like.

The discovery of the need of the present invention arose during work by the inventor with a digital color correction circuit. In digital color correction, the analysis to detect picture elements having particular hue and saturation characteristics to which correction or modification is to be applied is done by analyzing the values of various samples of digitized video signals. The principles involved are substantially the same as those used in analog domain color correctors.

The need to guard against aliasing in digital video signal processing is well known and recognized. CCIR Recommendation 601-1 includes a set of very specific requirements for anti-aliasing filters to be used with the digitization process in forming the standard sample sequences. So long as filters having the characteristics specified in the recommendation are used, the appearance of aliased frequencies will be kept to a minimum.

As is well known to those skilled in the art, the phenomenon of aliasing occurs in the digital processing of sampled signals. Aliasing is the name given to the phenomenon of the appearance of frequencies not present in the original signal that results from the presence in the sampled signal of frequency components which exceed one half of the Nyquist sampling frequency. Aliasing is particularly problematic in that it manifests itself as the appearance of non-existing frequencies in the resultant signal after conversion from the discrete time domain back to the continuous time analog domain. As is well known to those skilled in the art, the mathematics describing aliasing show that the spectrum of the aliased signals folds back on the spectrum of the signals of interest. Therefore, frequency components which lie slightly above one half the Nyquist value alias themselves as low frequency components. In digital video, distortion by the introduction of low frequencies manifests itself as shadows or the appearance of relatively large objects on the resultant picture. Thus, digitized visual images rapidly deteriorate in response to the appearance of aliased frequencies which can result from processing in the digital domain. This is the principle rationale for the rigorous specifications of anti-aliasing filters in Recommendation 601-1.

As noted hereinabove, the present inventor observed significant signal deteriorations in the resultant output when performing color correction in the digital, or discrete time, domain. It was discovered that significant changes in the saturation of colors possessing particular hues led to the appearance of low frequency distortion in the resultant output signal. Additionally, changes in gamma characteristics likewise led to distorted output results.

As is known to those skilled in the art, gamma ($\gamma$) characteristics of a video system refers to the slope of a curve describing a transfer function. In television receivers, gamma is greater than one at most values of luminance. This non-linear characteristic is used to compensate for the non-linear response of the human eye. The gamma values at any point on the curve simply refers to the slope of the curve at that point. The problems of distortion which were observed by the inventor were not present in the use of analog color correctors. After studying same for some length of time, the source of problem was identified as harmonic distortion which results from the non-linear characteristics of many color correction and modification processes. For example, adjustment of the gamma characteristics of a video signal inherently provide a non-linear transfer function. As is well known to those skilled in the art, any non-linear system will produce harmonic distortion in the form of harmonics of frequency components of the input signal.

Additionally, the inventor realized that a number of color enhancement functions performed by color correctors are non-linear. For example, when it is desired to emphasize a particular object in a scene, wherein the object has a detectable hue that is distinguishable from the hues of other objects in the scene, the occurrence of picture elements containing this hue can be detected and the saturation level can be non-linearly increased. In conventional color correctors, this has the effect of "highlighting" the particular object. For example, the hue distinctive to a soft drink can in an advertisement can be saturated so as to draw additional attention of the viewer to the can.

Since color correction enhancement of this type is non-linear in that there is normally a stepwise increase in the saturation level in a portion of an image, this also produces harmonic distortion.

Also, it is known that any overflow of the value of digital samples in a digital signal processing device is analogous to the clipping of an analog signal. As is the case with the clipping of an analog signal, the clipping of the digital signal creates harmonic distortion. The inventor also believes that this is a source of the distortion of the video signals observed while working with digital color correctors.

Any of the mechanisms which generate harmonic distortion at frequencies which lie above one half the sampling frequency will lead to those frequency components appearing as aliased frequencies in the final converted analog signal. It is known to those skilled in the art that when one is designing a sampling system from the ground up, the technique of over sampling can be used in order to provide increased bandwidth to accommodate high frequency distortion components. So long as sufficient bandwidth is available in the digital system, any undesired high frequency components will maintain their proper spectral identity and can be filtered out in the final phases of digital-to-analog conversion. In other words, the signals will not appear at aliased frequencies if the sampling rate is sufficiently high. However, for CCIR 601-1 type sources of digital video signals, the sampling frequencies, particularly for those of the two color different signals having the lower sampling frequency, is close to the Nyquist rate. Therefore, there is very little spectral head room and color and gamma correction performed on video signals at these sampling rates will quickly lead to distortion in the form of aliased frequencies resulting from harmonic distortion when any significant non-linear change is made to the signal levels.

It is within the scope of the prior art to take CCIR 601-1 digitized signal streams, convert same to corresponding analog RGB signals, and then to perform the primary and secondary color corrections and modifications on the resultant analog signals. The corrected or modified signal can then be passed through a signal matrix and reconverted to a digital bit stream. However, this introduces additional quantization noise and causes the designer of color correction equipment to forego the potentially increased resolution available from operating in the digital domain. Therefore, there is a need for a signal processing system which can accept the near Nyquist rate sample sequences from a 4:2:2 CCIR 601-1 device, perform color corrections which include non-linear operations in the digital or discrete time domain, and then provide output signals in a format which meets Recommendation 601-1.

SUMMARY OF THE PRESENT INVENTION

The present invention fulfills the above described need. In particular, it was created in response to the inventor's recognition of the inherent limitation of signals provided in a 4:2:2 format of CCIR Recommendation 601-1. The inherent limitation is the inability to perform significant non-linear operations on such signals without causing low frequency distortion resulting from aliased high frequency harmonic distortion components. Generally stated, the present invention is a digital video signal processor for processing a predetermined set of sampled signals. Each of the sampled signals is a video algebraic combination signal, as defined hereinabove, sampled at predetermined sampling frequencies, the ratios of which are ratios of small integers. The present invention first upsamples the respective sampled signals by a predetermined integer factor and then provides low pass filtering of same by a finite impulse response digital filter. The factors by which the signals are upsampled are preferably selected so that the resulting upsampled signals all have the same characteristic sampling rate. The upsampling is accomplished by providing a stream of samples at an increased sampling rate, preferably an integer multiple of the original sampling rate. For upsampling by a factor of K, each Kth sample from the original sampled algebraic combination signal is passed on to the new stream, and zeros are inserted for the other sample values.

The low pass filtering combined with the upsampling filters out unwanted additional spectral components and also provides interpolation of the values at the sample points for which zeros were inserted during the upsampling process.

These operations provide a predetermined set of upsampled signals which are then provided to a primary and secondary color corrector and processor operating in the digital domain. While the primary and secondary processor is an element of the system of the present invention, it is not, per se, a novel element of the present invention since digital color correctors and modifiers are known.

The output of the color correction and modification circuits are provided as a plurality of processed upsampled signals to the remaining apparatus of the present invention which reconverts the signals into CCIR Recommendation 601-1 format. These signals are first low pass filtered to remove harmonic distortion components which lie above one half of the specified Recommendation 601-1 sampling rates for each algebraic combination signal. This removes higher frequency harmonic distortion components that by employing the present invention have remained in their proper spectral locations as a result of the upsampling interpolation provided at the front end of the digital color correction modification apparatus. After filtering, each sampled stream is decimated by the same factor by which it was upsampled during the upward conversion. The decimation process provides a set of processed algebraic combination signals which are then ready to pass on to a utilization device such as a digital-to-analog converter and video tape recorder.

The present invention also encompasses the method of upsampling, filtering, color correction and modification, followed by further filtering and decimation described in connection with the apparatus of the present invention immediately above. It should be understood that the present invention includes apparatus to operate on one and only one stream of samples.

The preferred form of the present invention upsamples the luminance signal by a factor of two and the two color difference signals each by a factor of four to produce four upsampled signals having characteristic sampling rates of 27 megaHertz. Color correction and modification is accomplished on the sampled streams at this characteristic sampling frequency. The respective processed upsampled signals are then filtered and decimated as described hereinabove for provision of the resulting signals to a utilization device.

By adopting this arrangement and use of this method, the bandwidth available for containing harmonic distortion products without aliasing is significantly increased. For example, the preferred form of the present invention provides four upsampled signals at 27 megaHertz sampling rate. This signal stream can handle frequency components up to 13.5 megaHertz without causing aliased distortion frequency components to appear in the output signal. This can accommodate the fourth harmonic of the highest frequency component of interest in the color difference signals used in CCIR Recommendation 601-1. In most video signals, the higher frequency components tend to be of a lower magnitude. Therefore, there is even greater head room for distortion components resulting from the lower frequency/higher intensity portions of digitized video signals.

Thus, it is an object of the present invention to provide a signal processing apparatus which takes band limited digitized video signals, sampled at close to their Nyquist rate, and provide additional spectrum to accommodate harmonic distortion products resulting from non-linear operations on the signals.

It is a further object of the present invention to provide such a system which reconverts, by filtering and decimating, the output from the apparatus which performs the non-linear conversion back into a standard digital video signal format.

It is still a further object of the present invention to provide apparatus which allows the performance of significantly non-linear gamma and color correction and non-linear color modification in the digital domain without causing distortion in the resulting image.

It is still a further object of the present invention to provide a method and apparatus of processing sampled sequences of orthogonal algebraic combination signals which may be non-linearly processed in the digital domain without causing aliased components resulting from harmonic distortion to appear in the resultant images.

That the present invention satisfies these objects and overcomes the drawbacks of the prior art cited above will be apparent from the detailed description of the preferred embodiment, which follows.

BRIEF DESCRIPTION OF THE DRAWINGS

FIG. 2, consisting of FIGS. 2A through 2C, represent sample sequences at various points in the circuitry of FIG. 1.

FIG. 3, consisting of FIGS. 3A through 3E, are diagrams showing the spectral content of various sample sequences shown in FIG. 2 and other sample sequences at various points in the circuit of FIG. 1.

DETAILED DESCRIPTION OF THE PREFERRED EMBODIMENT

Figure 1:
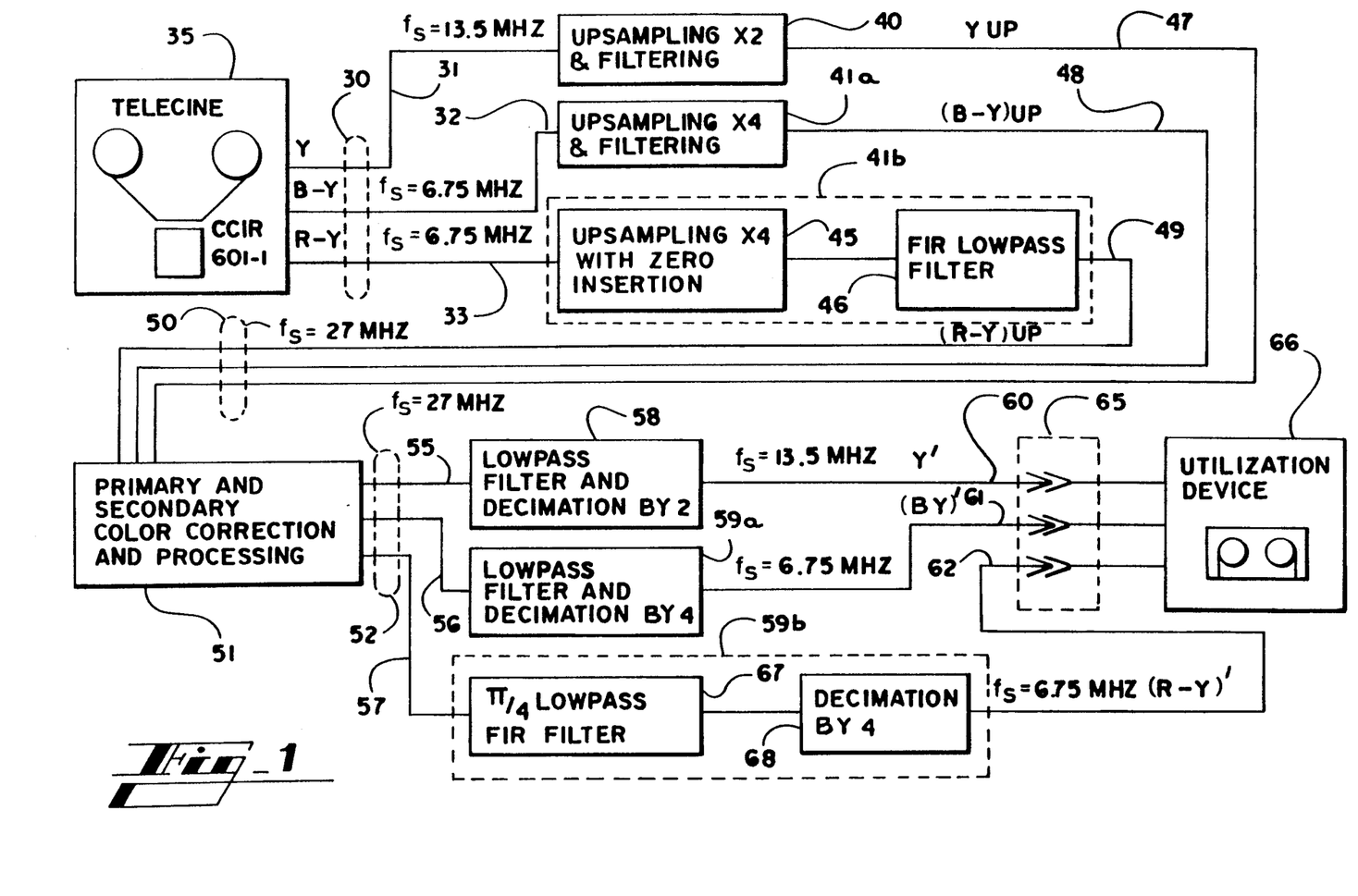
FIG. 1 is a block diagram of the preferred embodiment of the present invention.

Turning now to the drawing figures in which like numerals represent like parts, the preferred embodiment of the present invention will now be described. FIG. 1 shows a block diagram of the preferred embodiment of the present invention. The point of departure is a CCIR Recommendation 601-1 type source of digitized video signals indicated at 30. As is known to those skilled in the art, a standard 601-1 type data source provides samples of at least eight bits each of a luminance signal, and two color difference signals (R−Y) and (B−Y). The luminance signal Y is sampled at 13.5 megaHertz and each of the color difference signals is sampled at one half that rate, 6.75 megaHertz. The standard link 30 is broken out as three individual lines 31-33, each of which carries one of the algebraic combination signals defined by the Standard from telecine 35. The preferred embodiment of the present invention was created in connection with a system for color correction and modification as part of a film-to-tape transfer process.

Therefore telecine 35 is the source of the digitized video signals. However, it should be understood that a number of other devices, such as tape decks, video disk players, and paint boxes are known which produce similar sets of digitized video signals and that such devices may be used in embodiments of the present invention.

Strictly speaking, Recommendation 601-1 provides for time division multiplexing of the three algebraic combination signals in the pattern Y, (R−Y), Y, (B−Y), Y . . . In this disclosure, the individual lines 31-33 represent a breakout of these signals by demultiplexing the time slots to provide individual sequences of sampled signals. It should be understood that the use of standard 4:2:2 Y, (R−Y), (B−Y) signals is a feature of the preferred embodiment and is not, per se, limitation on the scope of the present invention. It will be apparent from the following description that embodiments of the invention for processing 4:4:4 RGB signal sequences can be produced by elementary modifications to the apparatus and methods constituting the preferred embodiment.

Each of lines 31-33 feeds a respective one of three upsampling and filtering devices. Block 40 in FIG. 1 represents the upsampling by a factor of two and filtering of the resultant sequence of samples, which operation is performed on the 13.5 megaHertz sampled sequence for the luminance signal Y. As described in greater detail hereinbelow, the upsampling is accomplished by providing one of the original samples at each sample period corresponding to the original sampling rate, with zero valued samples being into the time slots for the remaining sample times. This is referred to as zero insertion in this specification. Block 41 represents similar apparatus with upsampling by a factor of four with zero insertion that is applied to the R−Y color difference signal. Upsampling by 4 and filtering circuit 41b consists of an upsampler by a factor of four with zero insertion, shown as 45 in FIG. 1, followed by a finite impulse response (FIR) lowpass digital filter 46. Thus, it should be understood that upsampling by 4 and filtering circuit 41a physically includes the elements contained within dashed line 41b shown in the figure. Furthermore, upsampling by two and filtering circuit 40 contains similar elements except that the upsampling function is by a factor of two rather than a factor of four.

As is explained in more detail hereinbelow, the outputs from upsampling and filtering circuits 40 and 41 appear as respective sets of upsampled signals on lines 47-49, respectively. These are collectively shown as upsampled digitized video signal bus 50. These upsampled digitized video signals are provided to primary and secondary color corrector and processing device 51. The color corrector and processor 51 generally represents any digital apparatus which can process digital video signals with samplings rates on the order of 27 megaHertz. As noted hereinabove in connection with the background of the invention, the system of the present invention was designed in order to allow such a device to be used which had significant non-linear characteristics in the transfer function from its input to its output. Thus, any device which will analyze and modify hues, saturation, gamma characteristics, or any other parameter of a video signal may embody color corrector 51 in embodiments of the present invention.

As explained in more detail hereinbelow in connection with FIGS. 2 and 3, upsampling and filtering circuits 40 and 41 provide three sample sequences on lines 47-49, all of which have 27 megaHertz sampling rates. Color corrector 51 operates on the samples at the 27 megaHertz sampling rate. Three corresponding output lines, collectively shown as 52, are individually identified as 55-57. These carry sequences of processed upsampled signals for the luminance value Y and the (B−Y) and (R−Y) color difference signals, respectively. These processed upsampled signal sequences are provided to respective lowpass and decimation circuits 58 and 59a and 59b. Circuit 58 includes a digital lowpass FIR filter and a decimator to decimate the luminance signal on line 55 by a factor of two. This provides a processed output luminance signal on line 60 having a sampling rate of 13.5 megaHertz. This processed output signal on line 60 is in turn provided to one connector of a utilization device connector 65 that in turn carries it on to utilization device 66. It should be understood that utilization device 66 can be any apparatus which can make use of the processed output signals from utilization device connector 65. In the preferred embodiment illustrated in FIG. 1, utilization device 66 includes digital-to-analog converters for Recommendation 601-1 signals, and a video tape recorder.

Lowpass filter and decimation circuits 59a and 59b are identical. They perform the same function as circuit 58 except that they decimate their input signals by a factor of four rather than a factor of two. Therefore, lowpass filter and decimation circuits 59a and 59b provide processed output signals on lines 61 and 62, respectively, each at a sampling rate of 6.75 megaHertz.

The two functional blocks of the lowpass filter and decimation circuits are shown within the dashed line denominating circuit 59b. These include digital FIR filter 67 and decimator 68. As indicated on FIG. 1, the normalized bandwidth of FIR filter 67 is $\pi/4$. Naturally, the FIR filter in the luminance circuit has a normalized bandwidth of $\pi/2$.

As noted hereinabove, the present invention was designed to allow a color corrector modification circuit such as corrector 51 to provide non-linear operations on digital sampled sequence of video signals provided from standard Recommendation 601-1 devices. It accomplishes this by providing significant additional bandwidth over and above that which is available in signals provided from the standard output shown at 30 in FIG. 1. The way in which this is accomplished will now be explained in connection with FIGS. 1, 2, and 3. After this explanation, a description of the simplified schematic diagrams of the preferred embodiment shown in FIGS. 4 and 5 will be provided.

FIGS. 2 and 3 illustrate operation in one of the color difference signal channels, i.e., either the B−Y channel line between line 32 and line 61 or the R−Y channel line between line 33 and 62. The same principles apply to the luminance channel line between lines 31 and 60 except same are scaled by a factor of two with respect to what is illustrated in FIGS. 2 and 3. The appropriate scaling will be apparent to those skilled in the art.

Figure 2A:
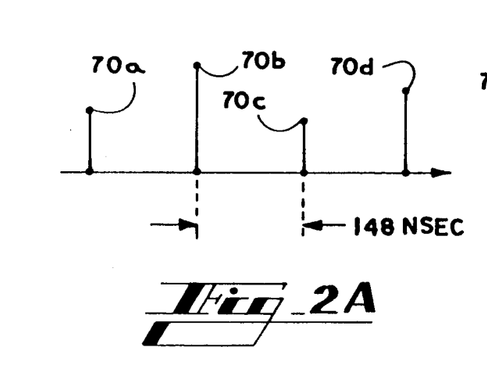
Figure 2B:
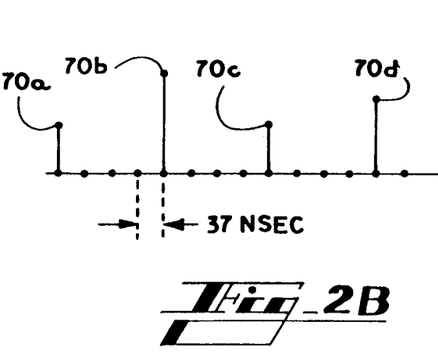

FIGS. 2 and 3 will be discussed in connection with the R−Y channel shown in FIG. 1. FIG. 2A illustrates the magnitudes of a typical sequence of samples 70a-70d as they appear on line 33. As shown in FIG. 2A the sampling period is approximately 148 nanoseconds. FIG. 2B shows the output of upsampling by four with zero insertion circuit 45. This circuit provides samples at four times the input sampling rate, or 27 megaHertz. As illustrated in FIG. 2B, the resulting sampling period is approximately 37 nanoseconds. As can be seen in FIG. 2B, original samples 70a–70d maintain their identities in value at the output of upsampling circuit 45. The intervening samples are all set to zero by upsampling circuit 45.

Figure 2C:
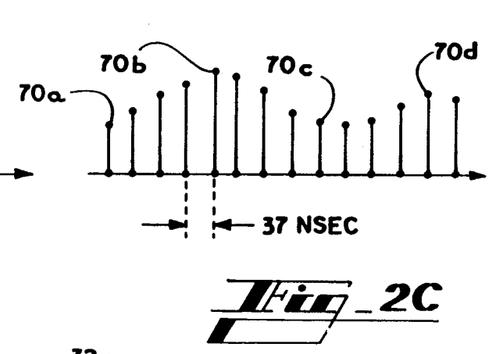

The output of circuit 45 is passed through digital finite impulse response filter 46. The resulting sample sequence which appears on line 49 is illustrated in FIG. 2C. The lowpass filter has a passband of approximately 3.38 megaHertz. In other words, it passes a signal of bandwidth which corresponds to the bandwidth of the sampled signal on line 33. As is illustrated in FIG. 2C, this has the result of interpolating the inserted zero samples (FIG. 2B) which lie between the original samples 70a–70d. It should be noted that this interpolation process is more accurate than predictive or buffered interpolation performed mathematically by analyzing original samples 70. Therefore, the sample sequence illustrated in FIG. 2C appears on line 49. As is illustrated in FIG. 2C, the sample sequence now has a sampling frequency of 27 megaHertz and samples track the values of the original sampled sequence shown in FIG. 2A.

Figure 3A:
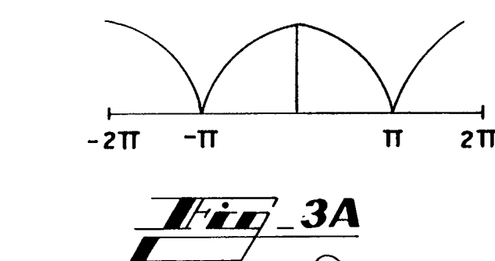

Before proceeding with what happens downstream of corrector 51, the effect on the spectral content of the sample sequence will be discussed in connection with FIGS. 3A and 3C. FIG. 3A illustrates an exemplary normalized spectrum for the input sample sequence on line 33. The spectrum occupies $2\pi$ of normalized bandwidth which, in the particular example shown is the equivalent of 6.75 megaHertz of bandwidth. It should be noted that this corresponds to plus and minus 3.38 megaHertz but the bandwidth on the negative frequency access must be considered when analyzing a discrete time system such as the preferred embodiment of the present invention.

Figure 3B:
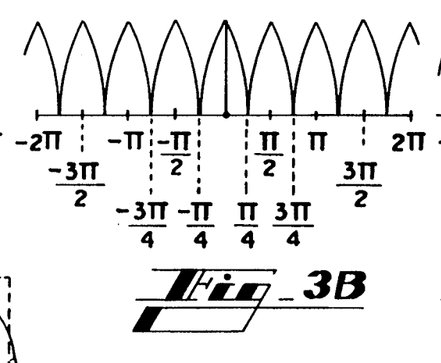

In FIG. 2B the effect of the upsampling and zero insertion on the spectrum is shown. Therein it can be seen that the normalized bandwidth is cut to plus or minus $\pi/4$ and that this pattern is repeated through the $-2\pi$ to $+2\pi$ spectrum. It should be kept in mind that the normalized spectra shown in FIGS. 3A–3E are shown as normalized with respect to the sampling frequency. Thus, the spectral information within one of the lobes shown in FIG. 3B is equivalent to the center lobe shown in FIG. 3A. However, it is compressed and multiplied by four in the normalized diagram because of the upsampling by a factor of four and the resultant fourfold increase in sampling frequency.

Figure 3C:
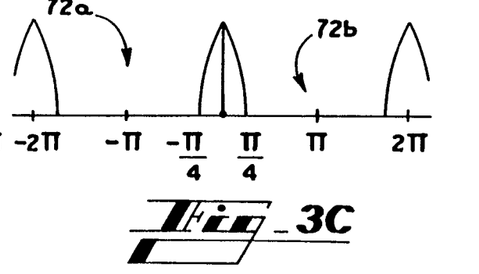

The frequency domain representation of the effect of FIR lowpass filter 46 may be seen by examining the differences between FIGS. 3B and 3C. By lowpass filtering the output of upsampling circuit 45, the spectral content of the filtered upsampled signal is illustrated in FIG. 3C. This leaves only the lobes centered about zero and plus and minus $2\pi$ on the normalized spectrum. Thus, it will be seen that the vacated areas of the normalized spectrum, indicated at 72a and 72b, constitute the spectral headroom referred to hereinabove which is available for occupation by harmonic distortion components which have a normalized frequency with a magnitude of less than $2\pi$.

Figure 3D:
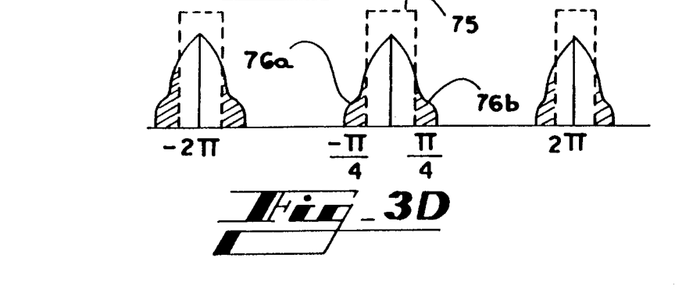

FIG. 3D illustrates both the spectrum of the processed upsampled signal on line 57 and the effect of lowpass filter 67. The resulting spectrum, including harmonic distortion spectral components having normalized frequency components with a magnitude greater than $\pi/4$ is illustrated in FIG. 3D. The cross hatched portions of the side lobes 76a and 76b represent the harmonic distortion components which result from non-linear operations of corrector 51. Dashed line 75 represents the passband of filter 67. FIG. 3D illustrates the beneficial effect of use of the present invention. While the harmonic distortion components 76a and 76b lie outside the normal spectrum of the signal accommodated by the 6.75 megaHertz sampling rate of Recommendation 601-1, they are well within the Nyquist criteria at the 27 megaHertz sampling rate for the signal at the input and output of lowpass filter 67. Therefore, these frequencies do not appear as aliased components, and it is possible to eliminate them by use of a filter having the passband characteristic shown as 75 in FIG. 3D.

Figure 3E:
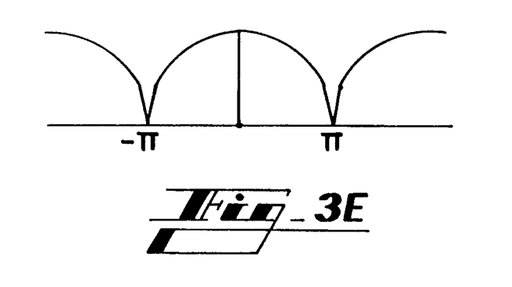

Decimator 68 decimates the sample sequence output from filter 67 and thus reestablishes the 6.75 megaHertz sampling rate on line 62. This has the effect of spreading the normalized spectrum, once again, between $-\pi$ and $\pi$. This is illustrated in FIG. 3E. As may be seen from inspection of same, the spectrum which has been modified by the operations of corrector 51, have the upper portions thereof cut off according to the Nyquist criteria. No components from the distortion lobes 76a and 76b appear in the resultant output spectrum illustrated in FIG. 3E. Therefore, the use of the present invention provides the additional spectral headroom 72a and 72b (FIG. 3C), allows a large range of harmonic distortion spectral components to appear and be filtered out without aliasing, and allows the resultant signals in the original passband to be reestablished and provided to utilization device connector 65. From this it will be appreciated that the preferred embodiment of the present invention, indeed, accomplishes the objects stated hereinabove and reduces the problem of aliased harmonic distortion components which originally plagued the inventor of the present invention when working on a color corrector and modifier circuit for operating on CCIR Recommendation 601-1 digital video signals.

Figure 4:
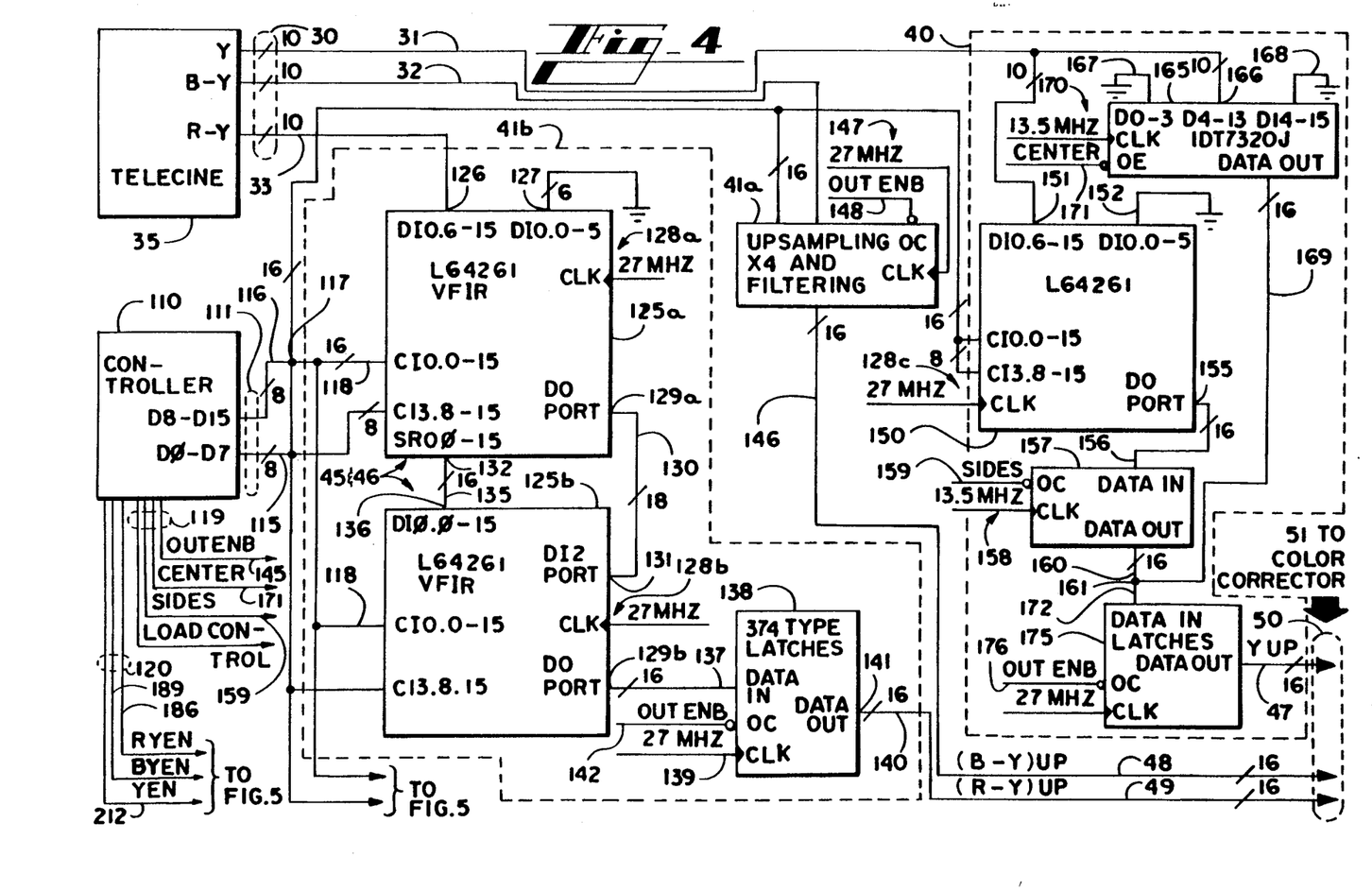
FIG. 4 is a simplified schematic diagram of the preferred embodiment of the upsampling and filtering apparatus shown in FIG. 1.
Figure 5:
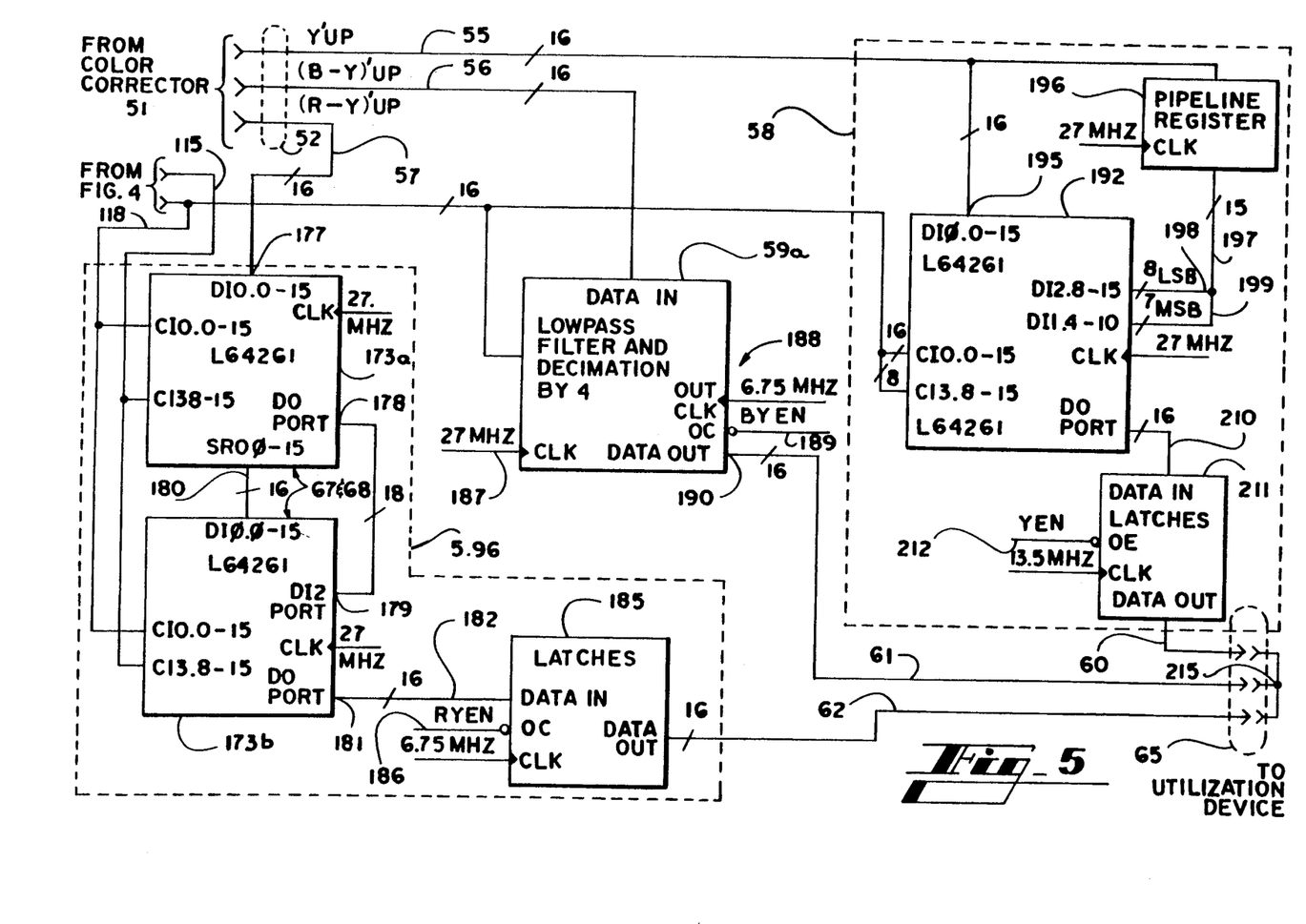
FIG. 5 is a simplified schematic diagram of the filtering and decimation circuitry shown in FIG. 1.

FIGS. 4 and 5 are simplified schematic diagrams illustrating a physical embodiment of the preferred embodiment and what the inventor believes to be the best mode of practicing the present invention. Turning first to FIG. 4, the preferred embodiment of the upsampling and filtering apparatus is shown. Lines 31–33 exit telecine 35 as in FIG. 1. On the left hand side of FIG. 4, dashed line 41b surrounds the upsampling and filtering circuitry which constitutes circuit 41b shown in FIG. 1. Since this is physically identical to circuit 41a, the latter is shown simply as a block in FIG. 4. On the right hand side of FIG. 4, the upsampling by two and filtering circuit for the luminance channel is surround by dashed line 40.

The preferred embodiment of the present invention is controlled by a controller 110. This is a dedicated computing device built around a Motorola 68020 microprocessor. Controller 110, in the preferred embodiment, uses a Multibus bus structure. Firmware driving controller 110 is stored on a hard disk and loaded into memory (not shown) for execution. The important aspects of causing controller 110 to generate the appropriate control signals will be apparent to those skilled in the art from the description of the signals and operation of the circuit contained hereinbelow. Controller 110 has a 16 bit data bus shown as 111, which includes subbuses for the eight least significant bits indicated at 115, and the eight most significant bits indicated at 116. These are joined at node 117 to form a 16 bit bus 118. A plurality of control lines, shown collectively as 119, are provided to provide timing signals to control the other circuitry shown on FIG. 4. Another plurality of control lines shown collectively as 120 is provided to provide timing signals to the filtering and decimation circuitry shown on FIG. 5.

Throughout FIGS. 4 and 5, various clock signals are shown as being provided to edge triggered clock inputs of various devices. Each of these clock signals is labeled with the clock frequency employed in the preferred embodiment. It is to be understood that these represent clock signals derived from a common synchronized timing source in a manner very well known to those skilled in the art. The individual lines have not been interconnected for the sake of simplicity of the drawing figures.

Next, upsampling by four and filtering circuit 41b will be described. The basic building block using the preferred embodiment is a type L64261 high speed versatile FIR filter (VFIR) integrated circuit currently made by LSI Logic Corporation of Milpitas, Calif. The L64261 is a VLSI integrated circuit that is a very specialized processor for implementing digital signal processing circuits. The operation and basic internal structure of this filter is described in an LSI Logic publication entitled "L64260/L64261 High Speed Versatile FIR Filter (VFIR) Preliminary". This publication is hereby incorporated by reference exactly as if set forth in full herein.

In FIG. 4, it can be seen that two of the L64261 chips are used to construct the upsampling by four and FIR lowpass filter circuit 41b. Two of these VFIR chips are required because the preferred embodiment for filter 41b is a 31 tap finite impulse response digital filter. As is explained in greater detail hereinbelow, filter 40, used in the luminance circuit, is a 17 tap filter and thus, requires only one of the VFIR chips.

In FIGS. 4 and 5, the notation of a slash through a single line on the drawing figure with a closely proximate number is used to indicate the number of conductors in multiconductor lines and buses. Line 33, which is ten bits wide, provides a sequence of samples of the R−Y color difference signal at 6.75 megaHertz to input 126 of VFIR 125a. This input is lines 6-15 of the DI0 data bus inputs of the chip. The six least significant bits of the DI0 data bus are shown as output 127 and are grounded to force their states to a logical 0. VFIRs 125a and 125b are clocked by 27 megaHertz clock signals as indicated at 128a and 128b.

The recombined 16 bit data bus 118 from controller 110 provides a 16 bit input to the tap 0 coefficient/data input port CI0 of both VFIRs 125a and 125b. Similarly, the eight most significant bits of the CI3 bus for the VFIRs are provided from the eight least significant bits of the controller data bus, by the extensions of subbuses 115 as shown in FIG. 4. The CI3 port is the tap 3 coefficient and data input port for these VFIRs. Thus, it will be understood that the coefficients used in establishing the filtering and upsampling by use of VFIRs 125a and 125b are provided on the multibus data bus from controller 110. These are written into the VFIRs by controller 110 in a manner which is known to those skilled in the art, and not described in detail herein.

Selection of the coefficients to establish the passband characteristics of filter 46 and to establish upsampling by four circuit 45 (FIG. 1) are described in the above referenced data sheet for the VFIRs and will be understood by those skilled in the art. Note that reference numerals "45 and 46" are shown on FIG. 4 and reference both VFIRs 125a and 125b. This is because the combination of these two VFIR chips physically implement blocks 45 and 46 shown in FIG. 1.

The output of VFIR chip 125a from the 20 bit filter data output port 129a is provided on an 18 bit wide bus 130 to the tap 2 data input port DI2 of VFIR 125b, shown at 131 on FIG. 4. Also, 16 bit shift register output 132 is provided on a 16 bit bus 135 to the DI0 port 136 of VFIR 125b. The output of upsampler and filter 41b appears as a 16 bit wide sample at the data output port 129b of VFIR 125b. These are provided on a 16 bit bus 137 as inputs to a set of 374 type latches 138 which are clocked at 27 megaHertz as indicated at 139. The outputs of latches 138 is a 16 bit wide data bus 140 connected to output 141. An output enable signal (OUT ENB) is connected to line 142. It can be seen that output enable signal is derived from line 145 shown exiting controller 110 at the left hand side of FIG. 4. It will be appreciated that if the values for the input sample sequence provided to input 126 is as shown in FIG. 2A, the output on line 137 provided in response thereto will be the sequence of samples illustrated in FIG. 2C. This sample sequence is clocked into latches 138 at 27 megaHertz. The output enable signal on line 142 synchronously provides samples of all three algebraic combination signals as will be appreciated from the description of the balance of FIG. 4. The outputs 141 of latches 138 are three state, and a low signal on line 142 effectively connects the output of the latches to physical outputs 141 connected to bus 140. Therefore, the samples from output 129b are synchronously clocked into latches 138. The output enable signal generated by controller 110 has a frequency of 27 megaHertz and a waveform such that it goes low after the data in latches 138 has had sufficient time to stabilize since it was last clocked by a positive going edge of the 27 megaHertz clock signal.

Upsampling by four and filtering circuit 41a is identical to 41b. It accepts input samples of the B−Y color difference signal on lines 32 which samples are ten bits wide. It outputs samples on 16 bit bus 146. The 27 megaHertz clock signal driving this circuit is indicated at 147 and the line 148 carrying the output enable signal should be understood to correspond to line 142 of circuit 41b. It will therefore be seen that the respective samples of the color difference signals are ultimately provided from bus 141 to multiconductor line 49 and from bus 146 to multiconductor line 48 for the R−Y and B−Y signals, respectively.

Turning next to upsampling by two and filtering circuit 40, its operation will now be described. This circuit is built around a single VFIR 150, also of the type L64261. Ten bit wide samples from line 31 are provided to the ten most significant bits of the DI0 data bus as indicated at 151. The six least significant bits of this bus are grounded, as indicated at 152 in FIG. 4. The connections of data buses 115 and 116 from controller 110 to the VFIR's CI0 and CI3 outputs are identical to those for VFIRs 128a and 128b in the color difference signal upsampling circuits. VFIR 150 is also clocked at 27 megaHertz as indicated at 128c.

The 16 bit wide output from VFIR 150 appears at the data output port 155. This is provided on bus 156 as an input to a set of latches 157. This latch is clocked at 13.5 megaHertz as indicated at 158. The output control for latches 157 is connected to line 159 which is an extension of line 159 exiting controller 110. The signal mnemonic on this line is SIDES. The 16 bit wide output from latches 157 appears on lines 160, which are connected to node 161.

A pipeline register 165, which is clocked at 13.5 megaHertz, also forms a part of filter 40. The original ten bit wide samples are provided on lines 31 to input 166 of a 16 bit wide pipeline register 165. In the preferred embodiment, the pipeline register is embodied by a type IDT7320 16 bit CMOS eight level pipeline register currently manufactured by Integrated Device Technology, Inc. of Santa Clara, Calif. Input 166 is to data input lines 4-13 of register 165. The four least significant bits and two most significant bits of the data in the pipeline register are forced to zero by grounding, as indicated at 167 and 168, respectively.

Pipeline register 165 is clocked at 13.5 megaHertz as indicated at 170. The outputs connected to bus 169 are three state, and they are controlled by the CENTER signal on line 171. Line 171 is an extension of line 171 coming from controller 110. The particular data input lines of pipeline register 165 to which the individual lines of 10 conductor sample bus 31 are connected are selected so as to effect a shift right of one position for the samples clocked into the register. It should be understood that this shift is referenced to significance of the bit positions on the 16 bit output bus at node 161. Therefore, in the design of the preferred embodiment, the shifting of data through pipeline register 165 from input 166 to output 169 effects a divide by 2 on each sample shifted all the way through the register.

Node 161 is also connected to 16 bit bus 172 which is the input to a set of latches 175. Latches 175 are clocked at 27 megaHertz and their outputs are controlled by the output enable signal (OUT ENB) on line 176. The outputs from latches 175 are 16 bits wide and appear on line 47 as shown in the right hand side of FIG. 4.

The CENTER and SIDES signals on lines 171 and 159, respectively, each have a period of 13.5 megaHertz. Each of these signals has a portion during which it goes low to connect the outputs from the respective devices they control to respective buses 169 and 160 which are tied to the common node 161. The low periods of each of these signals are symmetrically interlaced. Thus, if one viewed a timing diagram of the CENTER and SIDE signals superimposed on each other, the result has low going portions with a repetition rate of 27 megaHertz. The use of pipeline register 165 in conjunction with VFIR 150 in the implementation of this filter results from the mathematics of the filter, and the fact that every other input sample at the rate of 27 megaHertz to the filter is set to zero by the upsampling. As is known to those skilled in the art, the lowpass filtering is accomplished by multiplication of the samples by the impulse response of the filter. This is the discrete time domain's equivalent of convolution. The impulse response of the filter is the well know SINC function, i.e., sin (x)/x. Because every other input sample is zero, and the coefficients of the impulse response are alternately zero and non-zero values about the center lobe of the response curve, it turns out that alternate samples of the output are simply one of the original input samples multiplied by the coefficient contributed by the center lobe of the impulse response, which is 0.5. Alternate samples of contributions from the side lobes of the impulse response are calculated by VFIR 150.

Therefore, the designers of the preferred embodiment took advantage of this mathematical result by simply shifting the inputs to pipeline register 165 and taking the output of the register as every other sample of the upsampled and filtered output on bus 172. This is the contribution from the center lobe of the impulse response and thus, the signal mnemonic CENTER which controls the output from the pipeline register. Naturally, the depth of the pipeline register is selected so that the overall delay between input 166 and output 169 properly matches the delay through the VFIR chip 150 of calculated samples.

Turning next to FIG. 5, the preferred embodiment of the circuitry for processing output samples from color corrector as shown.

As will be appreciated from inspection of FIG. 5, there is significant symmetry between the upsampling and filtering circuitry of FIG. 4 and the filtering and decimation circuitry of FIG. 5. This circuitry is also constructed around the building blocks of the type L64261 VFIR manufactured by LSI Logic. As is the case for the upsampling circuitry, the decimation circuits 59a and 59b for the color difference channels are identical. The circuitry for 59b is illustrated on FIG. 5. It can further be appreciated that the topology of the interconnections for circuit 59b is identical to that for 41b, save that all 16 bits of the DI0 input port are connected to lines 57 at input 177. The cascading from the output of the DO port 178 of VFIR 173a to the DI2 input port 179 of VFIR 173b is the same as the cascading employed in the upsampling circuits 41. Extensions of data buses 115 and 118 are connected to the same tap coefficients inputs as was illustrated for circuit 41b in FIG. 4. Likewise, the shift register output is cascaded via bus 180.

As noted hereinabove, the type L64261 VFIRs were designed to perform both interpolation and decimation. Naturally, the coefficients written into VFIRs 173 are selected to perform decimation by four to implement the filter having the passband characteristic illustrated in FIG. 3D. As was the case with the upsampling circuits, two VFIRs are used to provide a 31 tap higher order filter than is required in the luminance channel. The output sequence that appears at DO port output 181 on bus 182 is a sequence having the sampling rate of 6.75 megaHertz. The sidelobes above the original bandwidth have been filtered off by the filtering function established by the coefficients loaded into VFIRs 173. Bus 182 provides input to a set of latches 185 which are clocked at 6.75 megaHertz, the outputs of which are controlled by the RYEN signal on line 186. This signal is generated by controller 110 (FIG. 4). The output of latches 185 appears on 16 bit bus 62 and is provided to utilization device connector 65.

It should be noted that reference numerals "67 and 68" are also indicated as pointing to both VFIRs 173a and 173b indicating that the combination of these two chips physically embody lowpass filter 67 and decimator 68 shown in FIG. 1.

Filter and decimator 59a is identical to that of 59b. The 27 megaHertz clock source on line 187 corresponds to the clocking of the VFIRs internal to block 59a. The 6.75 megaHertz clock indicated at 188 in the drawing represents the clock signal provided to the circuit's output latches, which are identical to latches 185 for circuit 59b. The enabling of the outputs from circuit 59a is controlled by the signal on line 189 which bears the mnemonic BYEN. The outputs from data port 190 appear on line 61 to utilization device connector 65.

Since the luminance samples only require decimation by two, a single VFIR 192 is employed for lowpass filter and decimation by two circuit 58. The 16 bit wide samples on line 55 are provided to the DI0 data input port 195. The coefficients are provided to VFIR 192 in the same manner as they are provided to the other VFIRs described hereinabove.

A pipeline register constructed of a pair of cascaded type IDT7320 pipeline registers is shown at 196. This is used to provide the 15 most significant bits, delayed by a predetermined number of cycles, onto bus 197. The eight least significant bits of these are provided on lines 198 and the seven most significant bits are provided on lines 199 to portions of the DI2 and DI1 input ports as indicated on FIG. 5. Those skilled in the art will appreciate the motivation for selection of these portions of the delayed samples in accomplishing the decimation and filtering function. The decimated sequence of samples of the filtered output appear on bus 210 as the input to latches 211. Latches 211 are clocked by a 13.5 megaHertz signal and their outputs are controlled by the signal on line 212 which carries a signal bearing the name YEN. The 16 bit wide output from latches 211 appears on lines 60 as the final input to utilization device connector 65.

It will be appreciated from inspection of FIG. 5 that downstream of utilization device connector 65, a node 215 is illustrated as combining the 16 bit buses 60-62. From the foregoing description, it will be apparent that control of the latched outputs for the decimator and filter circuit shown in FIG. 5 is accomplished to time division multiplex these output samples to node 215. It should be fully understood that such reestablishment of a time division multiplexed sequence, as is used in a device meeting Recommendation 601-1, is not a necessary aspect of practice of the present invention, but only the preferred form.

Furthermore, this description will clearly indicate to those skilled in the art the interrelationship among the output enabling signals controlling latches 185 and 211 and the corresponding latch within circuit 59a. Each of these signals contains a low going portion. The superimposition of all these signals would indicate low going portions recurring at a rate of 27 megaHertz. The enabling low going portions for the luminance enabling signal YEN occur at a repetition rate of 13.5 megaHertz. Similarly, the low going enabling periods for signals RYEN and BYEN occur at a repetition rate of 6.75 megaHertz. They are offset with respect to each other so that the sequence of samples which appears at node 215 is a set of processed output signal samples as follows: (R−Y), Y, (B−Y), Y, (R−Y) . . .

From the foregoing description of the preferred embodiment, it will be appreciated that the present invention is a solution to the problem identified by the inventor, as described hereinabove. It meets the objects of the invention as recited hereinabove and provides a practical mechanism for performing non-linear operations on sample sequences which meet CCIR Recommendation 601-1. Furthermore, it provides a mechanism for reestablishing a 601-1 4:2:2 signal sequence containing the processed output signals. Thus, the present invention provides a mechanism in which any color or signal processing apparatus can be inserted into the signal path between two existing devices conforming to this standard, and provide a modification to the signals. It can literally be plugged into an existing signal path.

It should further be appreciated that, as described briefly hereinabove, embodiments of the present invention may be constructed for use with an extended 4:4:4 format sample sequence. Such an embodiment would require only upsampling and decimation by a factor of two for each algebraic combination signal. The modifications to the preferred embodiment to implement same will be apparent to those skilled in the art in view of the disclosure. For each of the color difference signal channels, one of the VFIRs would be eliminated.

In view of the foregoing description of the preferred embodiment of the present invention, other embodiments will suggest themselves to those skilled in the art. Therefore, the scope of the present invention is to be limited only by the claims below.

I claim:

1. A digital video signal processor for processing an output from a digitizing video signal source that provides a predetermined set of sampled signals to provide a corresponding predetermined set of processed output signals to a utilization device connector, said predetermined set of sampled signals comprising a first sampled signal that is a first baseband algebraic combination signal sampled at a J megahertz sampling rate, a second sampled signal that is a second baseband algebraic combination signal sampled at an I megahertz sampling rate, and a third sampled signal that is a third baseband algebraic combination signal sampled at said I megahertz sampling rate, the ratio J/I being an integer, comprising in combination:

first upsampling and filtering means connected to said digitizing video signal source for interpolating said first sampled signal by upsampling by a factor of K to provide a first upsampled signal, K being an integer greater than one;

second upsampling and filtering means connected to said digitizing video signal source for interpolating said second sampled signal by upsampling by a factor of L to provide a second upsampled signal, L being an integer greater than or equal to K;

third upsampling and filtering means connected to said digitizing video signal source for interpolating said third sampled signal by upsampling by said factor of L to provide a third upsampled signal;

a digital video signal processor having an input connected to said first, second, and third upsampling and filtering means for operating on said first, second, and third upsampled signals to provide respective first, second, and third processed upsampled signals at a processor output;

first, second, and third lowpass digital filters connected to said processor output to provide respective first, second, and third filtered processed upsampled signals;

decimating means for decimating said first filtered processed upsampled signal by passing every Kth sample thereof and for decimating said second and third filtered processed upsampled signals by passing every Lth sample thereof to provide said predetermined set of processed output signals to said utilization device connector.

2. A digital video signal processor as recited in claim 1 wherein:
I=6.75;
J=13.50;
K=2; and
L=4.

3. A digital video signal processor as recited in claim 1 wherein:
I=13.50;
J=13.50;

K=2; and
L=2.

4. A digital video signal processor as recited in claim 1 wherein said sampling rates and factors are such that I times L equals J times K.

5. A digital video signal processor as recited in claim 1 wherein said first baseband algebraic combination signal is a luminance signal, said second baseband algebraic combination signal is a (red−luminance) difference signal and said third baseband algebraic combination signal is (blue−luminance) difference signal.

6. A digital video signal processor as recited in claim 1 wherein:

J=I; and said first baseband algebraic combination signal is a red signal, said second baseband algebraic combination signal is a green signal, and said third baseband algebraic combination signal is a blue signal.

7. A digital video signal processor for processing output from a digitizing video signal source that provides a sampled luminance signal sampled at 13.5 megahertz, a first sampled color difference signal sampled at 6.75 megahertz, and a second sampled color difference signal sampled at 6.75 megahertz, comprising in combination:

first upsampling and filtering means connected to said digitizing video signal source for interpolating said sampled luminance signal by upsampling by a factor of 2 to provide an upsampled luminance signal;

second upsampling and filtering means connected to said digitizing video signal source for interpolating said first sampled color difference signal by upsampling by a factor of 4 to provide a first upsampled color difference signal;

third upsampling and filtering means connected to said digitizing video signal source for interpolating said second sampled color difference signal by upsampling by said factor of 4 to provide a second upsampled color difference signal;

a digital video signal processor having an input connected to said first, second, and third upsampling and filtering means for operating on said upsampled luminance signal and said first and second upsampled color difference signals to provide a processed upsampled luminance signal and respective first and second processed upsampled color difference signals at a processor output;

a first lowpass digital filter connected to said processor output to provide a filtered processed upsampled luminance signal;

second and third lowpass digital filters connected to said processor output to provide respective first and second filtered processed upsampled color difference signals;

first decimating means for decimating said filtered processed upsampled luminance signal by passing every second sample thereof to provide a processed sampled luminance signal having a 13.5 megahertz sampling rate to a utilization device connector; and second and third decimating means for respectively decimating said first and second filtered processed upsampled color difference signals by passing every 4th sample thereof to provide respective first and second processed sampled color difference signals having 6.75 megahertz sampling rates to said utilization device connector.

8. A method of processing digital video signals output from a digitizing video signal source that provides a predetermined set of sampled signals, said predetermined set of sampled signals comprising a first sampled signal that is a first baseband algebraic combination signal sampled at a J megahertz sampling rate, a second sampled signal that is a second baseband algebraic combination signal sampled at an I megahertz sampling rate, and a third sampled signal that is a third baseband algebraic combination signal sampled at said I megahertz sampling rate, the ratio J/I being an integer, comprising the steps of:

providing a first upsampled signal by upsampling said first sampled signal by a factor of K, K being an integer greater than one, by providing a sample of said first sampled signal as each Kth sample of said first upsampled signal and providing zero valued samples for all other samples of said first upsampled signal;

lowpass filtering said first upsampled signal to provide a first interpolated signal;

providing a second upsampled signal by upsampling said second sampled signal by a factor of L, L being an integer greater than or equal to K, by providing a sample of said second sampled signal as each Lth sample of said second upsampled signal and providing zero valued samples for all other samples of said second upsampled signal;

lowpass filtering said second upsampled signal to provide a second interpolated signal;

providing a third upsampled signal by upsampling said third sampled signal by said factor of L, L being an integer greater than or equal to K, by providing a sample of said third sampled signal as each Lth sample of said third upsampled signal and providing zero valued samples for all other samples of said third upsampled signal;

lowpass filtering said third upsampled signal to provide a third interpolated signal;

operating on said first, second, and third interpolated signals by modifying at least some samples of at least one of said first, second, and third interpolated signals to provide respective first, second, and third processed interpolated signals;

lowpass filtering said first processed interpolated signal to provide a first filtered processed interpolated signal;

lowpass filtering said second processed interpolated signal to provide a second filtered processed interpolated signal;

lowpass filtering said third processed interpolated signal to provide a third filtered processed interpolated signal;

decimating said first filtered processed interpolated signal by passing every Kth sample to provide a first processed output signal at said J megahertz sampling rate;

decimating said second filtered processed interpolated signal by passing every Lth sample to provide a second processed output signal at said I megahertz sampling rate; and decimating said third filtered processed interpolated signal by passing every Lth sample to provide a third processed output signal at said I megahertz sampling rate.

9. A method of processing digital video signals as recited in claim 8 wherein:

I=6.75;

J=13.50;
K=2; and
L=4.

10. A method of processing digital video signals as recited in claim 8 wherein:
I=13.50;
J=13.50;
K=2; and
L=2.

11. A method of processing digital video signals as recited in claim 8 wherein:
said sampling rates and factors are such that I times L equals J times K.

* * * * *